July 4, 1972     C. L. HEDMAN, JR., ET AL     3,674,341
LIQUID CRYSTAL DISPLAY DEVICE HAVING IMPROVED OPTICAL CONTRAST
Filed Dec. 8, 1970     3 Sheets-Sheet 1
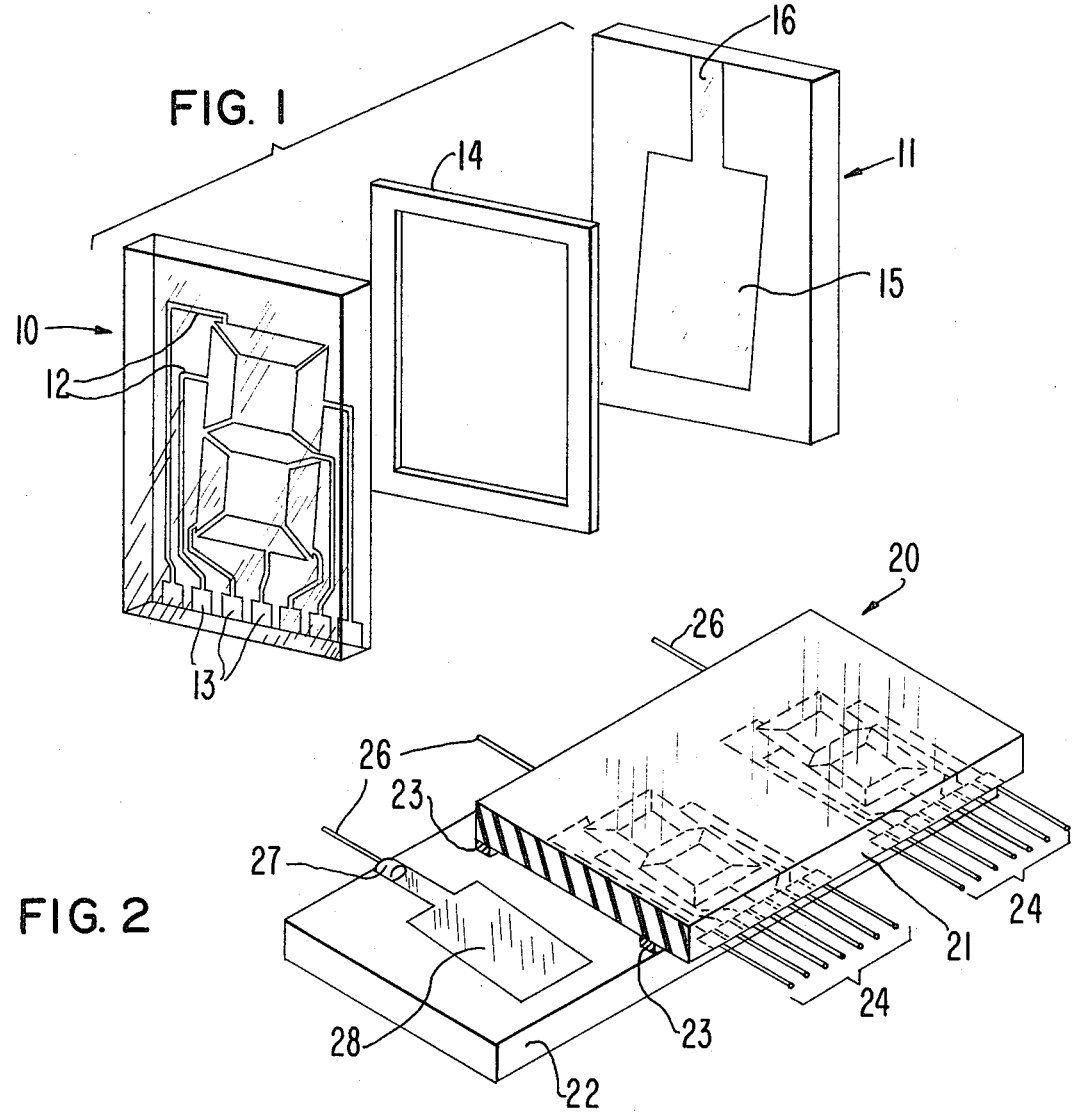
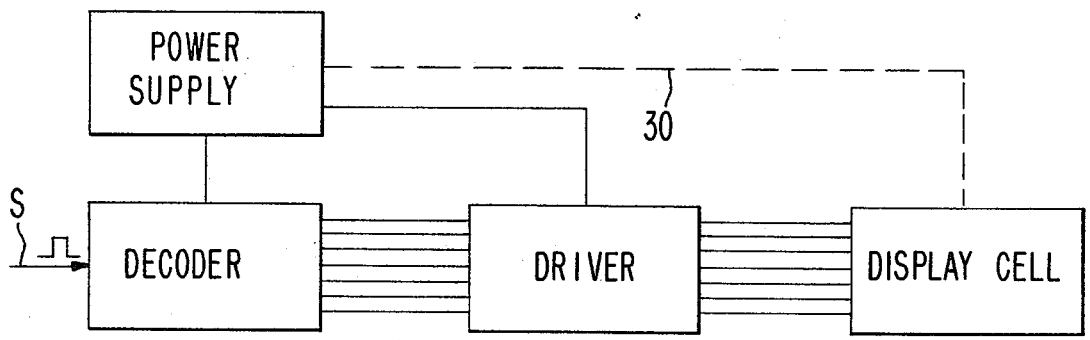
INVENTORS
CLARENCE L. HEDMAN JR.
KARL-DIETER S. MYRENNE
BY Robert B. Kennedy
ATTORNEY

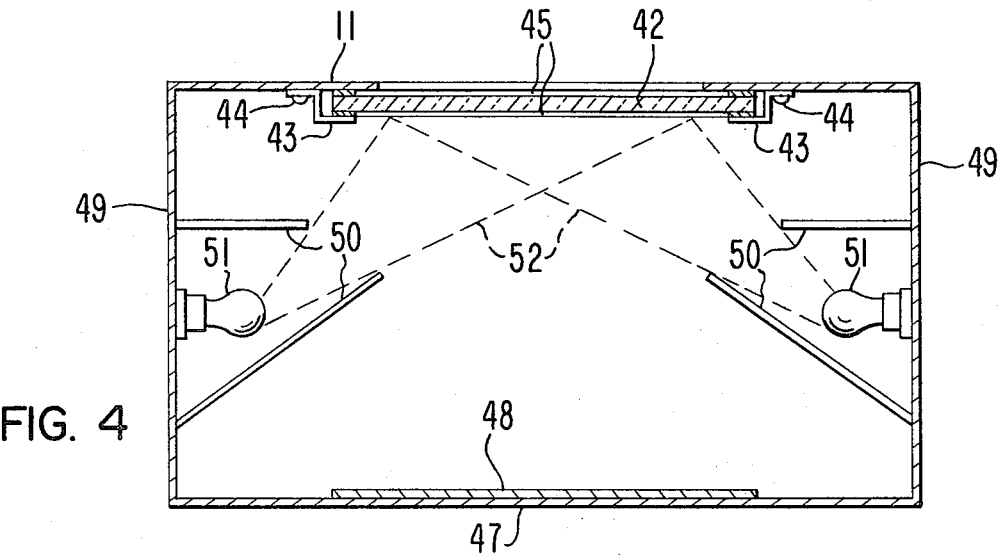
FIG. 4
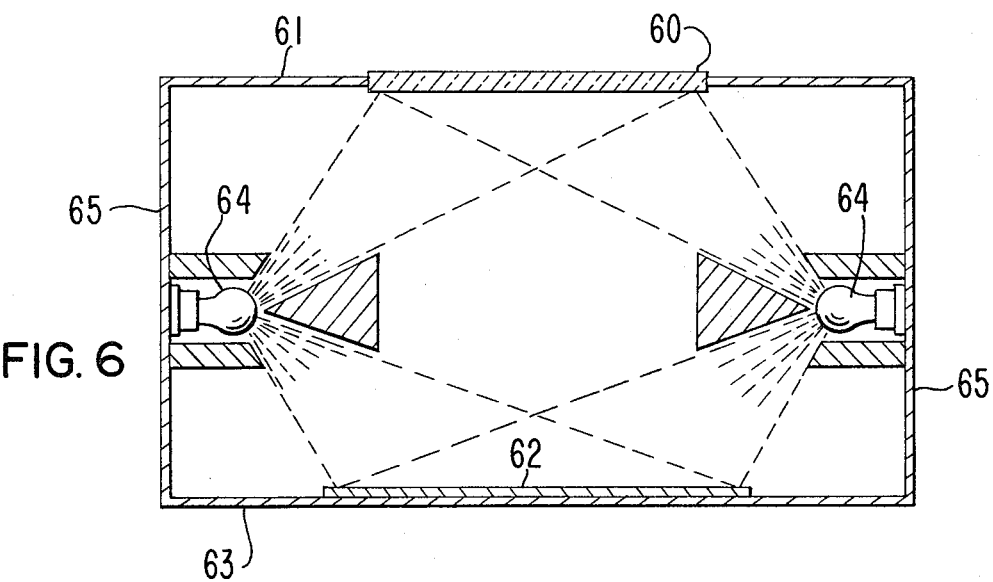
FIG. 6
FIG. 5
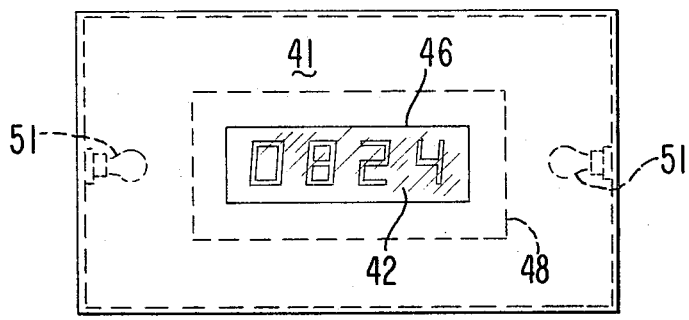
INVENTORS
CLARENCE L. HEDMAN JR.
KARL-DIETER S. MYRENNE
BY Robert B. Kennedy
ATTORNEY 3,674,341
LIQUID CRYSTAL DISPLAY DEVICE HAVING
IMPROVED OPTICAL CONTRAST
Clarence L. Hedman, Jr., Campbell, and Karl-Dieter S.
Myrenne, Sunnyvale, Calif., assignors to SCM Corporation
Filed Dec. 8, 1970, Ser. No. 96,146
Int. Cl. G02f 1/28
U.S. Cl. 350—160
6 Claims

ABSTRACT OF THE DISCLOSURE

An electro-optical display device is disclosed having a light source and a liquid crystal display panel. The display panel comprises an organic nematic mesomorphic compound confined between two substantially planar parallel surfaces of two juxtaposed transparent plates, and means for establishing electric fields through selected portions of the organic nematic mesomorphic compound. The display device also includes means for directing a beam of light from the light source obliquely onto at least one of the substantially planar parallel surfaces of the transparent plates and onto the organic nematic mesomorphic compound.

BACKGROUND OF THE INVENTION

This invention relates to electro-optical display devices of the type which employ crystalline liquids or "liquid crystals" as they are more commonly termed.

When thin layers of certain organic nematic liquid crystal compositions in their mesomorphic state are placed within the bounds of an electric field above a threshold value the degree of light sccattering exhibited by the layer is seen to increase substantially. This phenomenon was utilized in an early light valve taught in 1936 by British Pat. No. 441,274.

More recently, it was observed that when only selected portions of such a layer of liquid crystal is placed in an electric field the increase in scattering is sharply confined to those portions lying within the field. The contrast in scattering between those portions within and those portions without the field is quite pronounced. This observation rendered liquid crystals particularly suitable for use in visual display devices. In 1967 U.S. Pat. No. 3,322,485 disclosed such a device comprising two substrates having adjacent parallel surfaces less than ½ mm. apart confining an organic nematic mesomorphic compound therebetween. Selected portions of the spaced, opposing surfaces are coated with a transparent, electrically-conductive material in shapes representative of visual information such as alphanumeric characters. Each coating is connected to a source of electric energy. When the voltage thus applied reaches a threshold value, which value is determined by the composition and thickness of the particular organic nematic compound used, a change in the optical properties of the compound is observed in those regions located in the induced electric fields between the two conductive coatings. Those regions located without the bounds of the field remain transparent. The device may operate either in a transmitting mode with a light source positioned on the opposite side of the display from the observer, or in a reflecting mode with the light source and observer both located on one side. In the transmitting mode both substrates are transparent whereas in the reflecting mode only one substrate need be transparent.

In 1969 Great Britain Pat. No. 1,167,486 taught means for increasing the contrast ratio of electro-optical devices of the type just described. This was achieved in one manner by placing a black or light absorptive background adjacent the display so that light passing through unenergized regions of the liquid crystal layer impinge thereon and are absorbed. Another manner of enhancing optical contrast was through change in the liquid crystal composition itself. For example, it was found that the addition of trace amounts of p-, n-butoxybenzoic acid to anisylidene-p-aminophenylacetate improves the clarity of anisylidene-p-aminophenylacetate liquid crystal compositions thereby rendering its appearance less milky which otherwise causes a degree of zero field reflection.

In 1970 U.S. Pat. 3,499,702 taught yet other means for enhancing optical contrast which term throughout this specification is intended to encompass contrast in light intensity, wavelength or both whereby viewers may visually distinguish illuminated from unilluminated regions of a display device. In this patent it was disclosed that the inclusion of cross polarizers disposed on each side of a transmissive type liquid crystal display enhances contrast ratio by taking advantage of the birefringent properties of the liquid crystal composition which causes rotation of the plane of polarization of polarized light incident thereon. The presence of the first polarizer nearer the incident light source causes light emitted therefrom to pass through the liquid crystal in polarized form. The second polarizer is oriented with respect to the first polarizer so that in the absence of an electric field applied to the device a substantial portion of light passes through the second polarizer. In this condition the entire display appears uniformly bright to an observer. However, when an electric field is applied the domains of the liquid crystal composition align such that the molecules are parallel to the direction of the incident light. When this occurs the plane of polarization is not rotated and hence the second polarizer may impede the passage of light therethrough. The display thus appears dark in those regions of the applied field.

The principal advantage liquid crystal type electro-optical devices offer as visual displays is that of low power consumption. Other electro-optical display devices, such as those which employ Nixie tubes, light emitting diodes, and cathode ray tubes, consume several orders of magnitude more power. In addition, liquid crystal displays occupy less space for the same display area and offer cost savings and high reliability. The principal disadvantages associated with their use have been those of low contrast, slow reaction time, and the need to heat many liquid crystal compositions to place them in their mesomorphic state. Advances have been recently made in overcoming each of the problems. Nevertheless, the problem of relatively low contrast has stubbornly persisted.

Accordingly, it is a principal object of the present invention to provide a liquid crystal display device having improved optical contrast.

SUMMARY OF THE INVENTION

Briefly described, the present invention is an electro-optical display device having a light source and a liquid crystal display panel. The display panel comprises an organic nematic mesomorphic compound confined between two substantially planar parallel surfaces of two juxtaposed transparent plates, and means for establishing electric fields through selected portions of the organic nematic mesomorphic compound. The display device also includes means for directing a beam of light from the light source obliquely onto at least one of the substantially planar parallel surfaces of the transparent plates and onto the organic nematic mesomorphic compound.

BRIEF DESCRIPTION OF THE DRAWING

FIG. 1 is an exploded view of a liquid crystal cell which may be used in practicing the present invention.

FIG. 2 is a perspective view of a multi-cell liquid crystal display panel with a portion of one panel member removed.

FIG. 3 is a block diagram of electrical circuitry utilized in operating liquid crystal display panels of the type shown in FIG. 2.

FIG. 4 is a plan view with top removed of a preferred embodiment of the liquid crystal display device of the present invention.

FIG. 5 is a front view in elevation of the liquid crystal display device shown in FIG. 4.

FIGS. 6–9 each present a plan view of other, different embodiments of the liquid crystal display device of the present invention.

DESCRIPTION OF THE PREFERRED EMBODIMENTS

Figure 7:
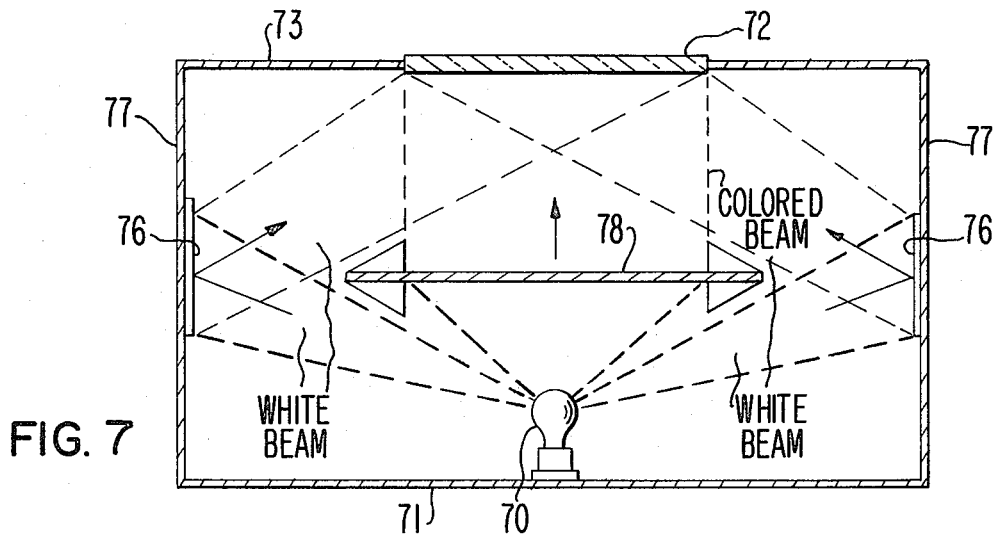

Referring now in more detail to the drawing there is shown in FIG. 1 an exploded view of one cell of a liquid crystal display panel comprising two thin transparent plates 10 and 11 which plates may be made of such materials as ordinary plate glass, fused quartz and transparent plastics or resins. Two adjacent surfaces of the plates are selectively coated with a transparent, electrically-conductive material comprising indium oxide or tin oxide such as Nesatron or Nesa. The conductive coating on plate 10 is seen to be patterned in the form of a blocked figure eight character consisting of seven spaced character segments. A portion of this coating extends from each segment to form an electric lead 12 which lead connects each segment with an associated segment terminal 13. The conductive coating on plate 11 is seen to be patterned in the form of a rectangle 15 having a periphery in juxtaposition with the periphery of the figure eight pattern on plate 10 once the two plates are assembled. An extension 16 of this coating from the periphery of rectangle 15 provides electrically connective means.

Sandwiched between the two opposing, coated surfaces of plates 10 and 11 is a hollow, dielectric spacer 14. During cell assembly the space bound by plates 10 and 11 and spacer 14 is filled with an organic nematic mesomorphic compound. Thus, spacer 14 also serves as a sealer once the cell is assembled. Examples of suitable organic nematic mesomorphic compounds include deca-2,4, dienoic acid, 4,4'-di-n-heptoxyazoxybenzene, 4,4' - dimethoxystilbene, and 4-p-methoxybenzylideneaminobiphenyl.

Once the cell is assembled and maintained in the temperature range in which the confined compound exhibits the nematic mesophase, that is in the temperature range above the nematic transition temperature of the compound but below the temperature at which the compound becomes isotropic, the cell may be operated by establishing one or more electric fields through the confined compound. For example, should one wish to display a figure eight, connective means 16 and each of the seven segment terminals 13 would be coupled to a source of electric energy. Such energy source may be quite weak such as one capable of establishing some 20 volts between the figure eight coating segments and rectangle coating 15 with a one mil spacing therebetween. Once the threshold value is surpassed light impinging on the figure eight segments is seen to be scattered several orders of magnitude more than light passing through the plates adjacent the segments. Should one wish to display the figure zero instead connective means 16 and each segment terminal 13 except that connected to the mid horizontal segment would be coupled to the electric energy source. In this manner each numerical digit may be displayed by the single cell. A number of cells may, of course, be assembled in side by side fashion to form multi-digit numbers.

FIG. 2 illustrates a liquid crystal display panel 20 comprising three assembled cells of the type just described. Upper transparent plate 21 is seen to overlay lower transparent plate 22 with spacer 23 sandwiched therebetween. It should be noted that plates 21 and 22 are slightly offset from one another. This disposition provides access to the conductive coatings on each plate so that external electrical conductors may be easily joined thereto as illustrated. Flexible cables 24 each include seven insulated conductors each of which are respectively connected to an individual segment terminal 25. Four insulated conductors 26 are likewise respectively joined to coating extensions 27 of rectangular coatings 28 on lower plate 22.

FIG. 3 illustrates in block diagram form the electrical operation of one cell of the liquid crystal display panel shown in FIG. 2. A binary coded decimal input signal S is fed into a decoder which transmits signals through one or more of seven conductors through a driver to one or more of the seven character segments in the liquid crystal display cell, respectively. A power supply for the decoder is shown which may be utilized, where required or desired, to heat the liquid crystal in the display cell, as diagrammatically illustrated by line 30, to place the liquid crystal composition in its nematic state.

FIGS. 4 and 5 illustrate a preferred embodiment of the invention with the electrical connections omitted for the sake of clarity. The electrical connections and peripheral electronic apparatus shown and described in FIGS. 2 and 3 are suitable for use with this embodiment.

The display device is seen to comprise a parallelepiped housing, which preferably is opaque, having a front housing member 41 to which is mounted a liquid crystal display panel 42 by means of mounting brackets 43, screws 44 and rubber washers 45. Display panel 42 is mounted in alignment with housing aperture 46 whereby it may be viewed from without the housing through the aperture. To rear housing member 47 is affixed a black, light-absorbent screen 48 in alignment with aperture 46 and display panel 42. To each side housing member 49 are mounted two light baffles 50 between each set of which is mounted a light source 51. With this arrangement each light source is capable of projecting a beam of light 52 obliquely onto display panel 42. The power supply illustrated in FIG. 3 may be conveniently used in powering the lights. Although two lamps are shown in this embodiment it should, of course, be understood that the use of only one would suffice. The presence of two light sources however provides more uniform illumination of the display panel. Of more importance though is the fact that color change may be effected through the use of two different colored lights. For example, one of the light sources may provide a blue beam of light falling obliquely in display panel 42 and the other light source an oblique beam of red light. Through standard switching circuitry well known in the art the device may be operated with either only the blue light or only the red light ignited, or with both the blue and red lights ignited to produce a third color on the display panel. Alternatively, one lamp may always be on while the device is operative and the other switched on and off to effect color switchin. With such arrangements the displayed characters have the capacity of changing color in response to input signals.

With the display device illustrated in FIGS. 4 and 5 display panel 42 is illuminated by light beams 52 which impinge thereon at oblique angles. Ambient light entering the device through aperture 46 and display panel 42 strikes screen 48 and is largely absorbed thereby. This also holds for light emanating from light sources 51 themselves which may be reflected by the display panel or other structural elements within the device onto screen 48. As a result the display panel will appear very dark when viewed from without the housing except for those portions in which an electric field above threshold is impressed through the organic nematic mesomorphic compound. Thus, digits 0824 appear bright in the display panel shown in FIG. 5 while the remaining portions of the display panel appear quite dark. Again, this is due to the fact that light striking the energized portions is forward scattered by the compound while light striking the unenergized portions passes on through the transparent panel to each side of the viewer.

FIG. 6 illustrates another embodiment of the invention in which transparent liquid crystal display panel 60, such as that shown in FIGS. 1–3, provides a window in front panel member 61 of the device housing. A colored screen 62 is affixed to rear panel member 63 of the housing in alignment with display panel 60. Two lamps 64 are respectively affixed to two side panel members 65 of the device housing. Again, only one of the two lamps here is required. With this configuration lamps 64 project beams of light both onto display panel 60 and onto colored screen 62. Light from lamps 64 striking those portions of the display panel organic nematic mesomorphic compound disposed within the bounds of imposed electric fields is forward scattered. Light passing directly from lamps 64 through the unenergized portions of the organic nematic mesomorphic compound is only slightly scattered by the transparent display panel. As the lamps are set to each side of the display panel they are not directly observed by a viewer located in front of the device unless the viewer is observing the panel from well off to one side. As light from the lamps is also directed onto colored screen 62, light reflected therefrom is observed through unenergized portions of transparent display panel 60. As a consequence displayed characters will appear both brighter and of a different color than their background. Contrast ratios of several orders of magnitude may be obtained with this arrangement.

FIG. 7 illustrates another embodiment of the invention in which lamp 70 is mounted on rear wall 71 opposite liquid crystal display panel 72 which is mounted within an aperture in front wall 73. Color diffuser 78 is interposed between lamp 70 and display panel 72. White light from lamp 70 propagated directly towards display panel 72 is converted to a colored beam by diffuser 78. White light passing to either side of the diffuser is not so converted but is reflected by two mirrors 76 mounted on side walls 77 onto display panel 72 at an oblique angle thereto. In operation a viewer may thus observe white characters displayed against a colored background. The characters may, of course, be slightly tinted by the colored beam.

Figure 8:
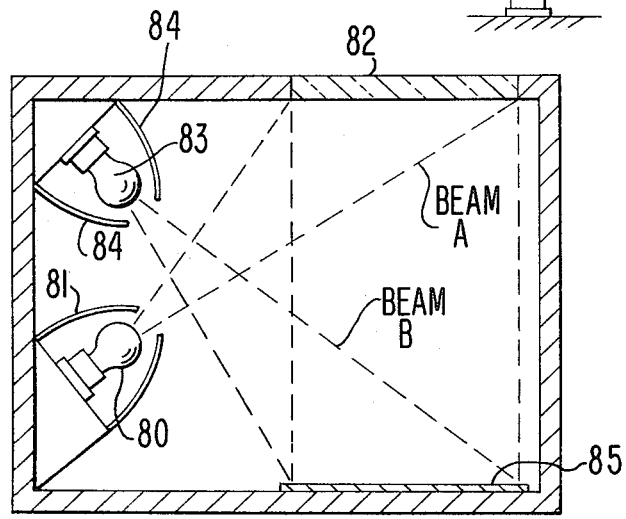

FIG. 8 illustrates another embodiment of the invention in which lamp 80 is mounted within light baffler 81 to project Beam A of light obliquely onto liquid crystal display panel 82. Lamp 83 is also mounted within light baffler 84 to project Beam B of light normally onto the liquid crystal display panel. With this embodiment the device may, of course, be operated with lamp 80 ignited and lamp 83 extinguished in which case energized characters of the display panel are illuminated against a dark background. The color of the characters will thus be dependent upon the color of Beam A. Alternatively, both lamps 80 and 83 may be ignited. In such mode the intensity of Beam A should preferably be greater than the intensity of Beam B at display panel 82. If both beams are of the same color the energized characters will appear a different shade of that color than the unenergized portions of the display panel. If the color of Beam A differs from that of Beam B then the energized characters will appear as a combination of the two colors against a background of the color of Beam B only.

Figure 9:
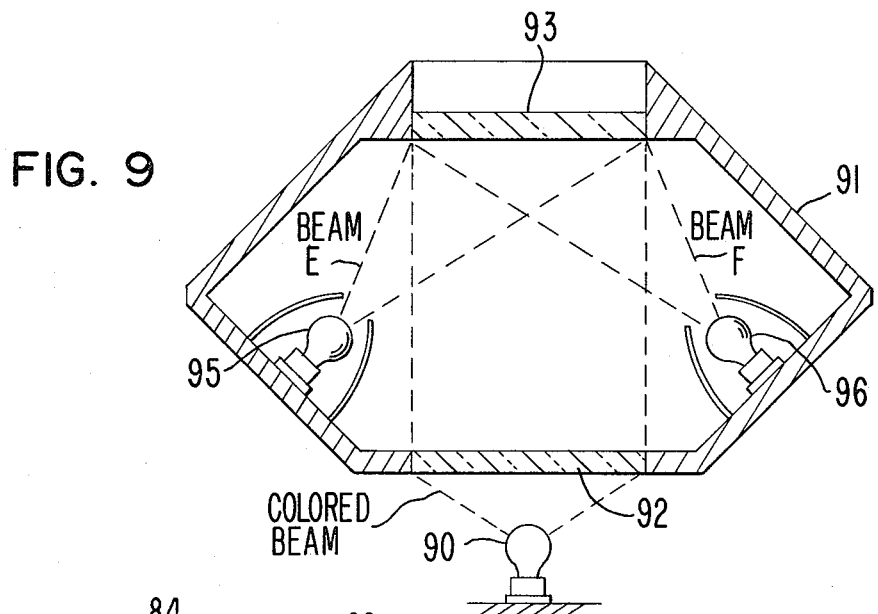

FIG. 9 illustrates yet another embodiment in which a beam of colored light is projected from lamp 90 located without the bounds of housing 91 through diffuser 92 in housing 91 and normally onto liquid crystal display panel 93 located in housing aperture 94. Beams E and F are respectively projected from lamps 95 and 96 obliquely onto liquid crystal display panel 93. In this case lamp 95 is of a different color than lamp 96. This arrangement provides means for displaying characters of either the color of Beam E or of Beam F against the background of the colored beam by merely switching either lamp 95 or lamp 96 to its on position. An application of this is that of a display device coupled to a calculator by which positive digits are displayed in yellow and negative digits in red against a dark blue background. A fourth lamp, not shown, may also be incorporated to project another beam of light obliquely onto the display panel. In the above example such could be green to denote entry recall figures.

It should be understood that the just described embodiments merely illustrate principles of the invention. Obviously, many modifications may be made thereto without a departure from the spirit and scope of the invention as set forth in the following claims.

We claim:

1. An electro-optical display device comprising:
   (A) a housing;
   (B) a liquid crystal display panel disposed for viewing from without said housing and comprising a normally transparent organic nematic mesomorphic compound confined between two substantially planar parallel surfaces of two juxtaposed transparent plates, and means for establishing electric fields through selected portions of said organic nematic mesomorphic compound, said selected portions becoming translucent when said field is established;
   (C) means for selectively projecting first and second discrete beams of light from within said housing obliquely through at least one of said substantially planar parallel surfaces and onto said organic nematic mesomorphic compound, each of said beams being of a respective color; and
   (D) a reflection member of a particular color disposed within said housing in opposed spaced alignment with said liquid crystal display panel; at least one of said first and second light projecting means comprising means for projecting an auxiliary beam of light obliquely onto said reflection member, discrete wavelengths of each said auxiliary beam being reflected thereby through the transparent portions of said liquid crystal display panel in accordance with the color of said reflection member.

2. A display device in accordance with claim 1, wherein said particular color of said member is the same as the color of one of said beams of light.

3. An electro-optical display device in accordance with claim 1 further comprising:
   (E) means for projecting a 3rd beam of light of a 3rd color differing from said 1st and 2nd colors from within said housing obliquely through at least one of said substantially planar parallel surfaces and onto said organic nematic mesomorphic compound.

4. An electro-optical display device comprising:
   (A) a housing having opposing side walls;
   (B) a single light source within said housing;
   (C) a liquid crystal display panel disposed for viewing from without said housing comprising an organic nematic mesomorphic compound confined between two substantially planar parallel surfaces of two juxtaposed transparent plates, and means for establishing electric fields through selected portions of said organic nematic mesomorphic compound;
   (D) a colored diffuser disposed between said light source and said display panel; and
   (E) a specular reflection member mounted on one of said side walls for directing a first beam of light from said light source obliquely onto at least one of said substantially planar parallel surfaces and onto said organic nematic mesomorphic compound.

5. An electro-optical display device in accordance with claim 4 wherein said light source is of a color differing from said diffuser color.

6. An electro-optical display device in accordance with claim 4, wherein a specular reflection member is mounted on each said side wall.

References Cited
UNITED STATES PATENTS

| | | | |
|---|---|---|---|
| 3,592,527 | 7/1971 | Conners et al. | 350—160 |
| 3,123,042 | 3/1964 | Merlin | 350—110 |
| 3,499,112 | 3/1970 | Heilmeier et al. | 350—160 |

OTHER REFERENCES

Soref: "Electronically Scanned Analog Liquid Crystal Displays," App. Opt. vol. 9, No. 6 (June 1970), pp. 1323–1329.

DAVID SCHONBERG, Primary Examiner

P. R. MILLER, Assistant Examiner

U.S. Cl. X.R.

350—110, 150, 156